United States Patent [19]

Verschage

[11] 4,372,572
[45] Feb. 8, 1983

[54] LIFT BED TANDEM AXLE TRAILER

[75] Inventor: Richard Verschage, Kewanee, Ill.

[73] Assignee: The Advance Metalworking Co., Kewanee, Ill.

[21] Appl. No.: 243,783

[22] Filed: Mar. 16, 1981

[51] Int. Cl.³ ........................ B60P 1/02; B62D 21/02
[52] U.S. Cl. ................................ 280/423 B; 414/495
[58] Field of Search ............ 280/423 B, 423 R, 43.11, 280/43.13, 43.17, 43.18, 43.22, 43.23, 43.24, 43.2, 81 R, 414 J, 490 R, 682, 683, 686, 766, 789; 414/476, 484, 495, 469, 534

[56] References Cited

U.S. PATENT DOCUMENTS

| | | | |
|---|---|---|---|
| 3,322,292 | 5/1967 | Bogh et al. | 280/43.11 X |
| 3,429,585 | 2/1969 | Ross | 280/423 B |
| 4,060,145 | 11/1977 | Kingman et al. | 280/423 B X |
| 4,120,513 | 10/1978 | Hurt | 280/423 B |

FOREIGN PATENT DOCUMENTS 629111 9/1978 U.S.S.R. ........................ 280/423 R

Primary Examiner—Joseph F. Peters, Jr.
Assistant Examiner—M. J. Hill
Attorney, Agent, or Firm—Mason, Kolehmainen, Rathburn & Wyss

[57] ABSTRACT

A lift bed, tandem axle trailer includes a bed with a load supporting base structure and a pair of wheel support arms mounted for pivotal movement about longitudinally spaced apart, transverse axes on each side of the bed for raising and lowering the bed with respect to a road or supporting surface. An axle and wheel is mounted at the outer end of each support arm. A tongue extends forwardly of the trailer bed with the forward end adapted to be hitched to a towing vehicle. Load equalizing linkages are provided between the forward and rearward support arms on each side of the bed and this linkage is interconnected with a lift on each side of the bed for pivoting the support arms to raise and lower the bed to the desired level for loading/unloading or travel. A shock absorber assembly is interconnected with the lift on each side of the bed for providing a smoothed out ride for the trailer bed during travel.

11 Claims, 4 Drawing Figures

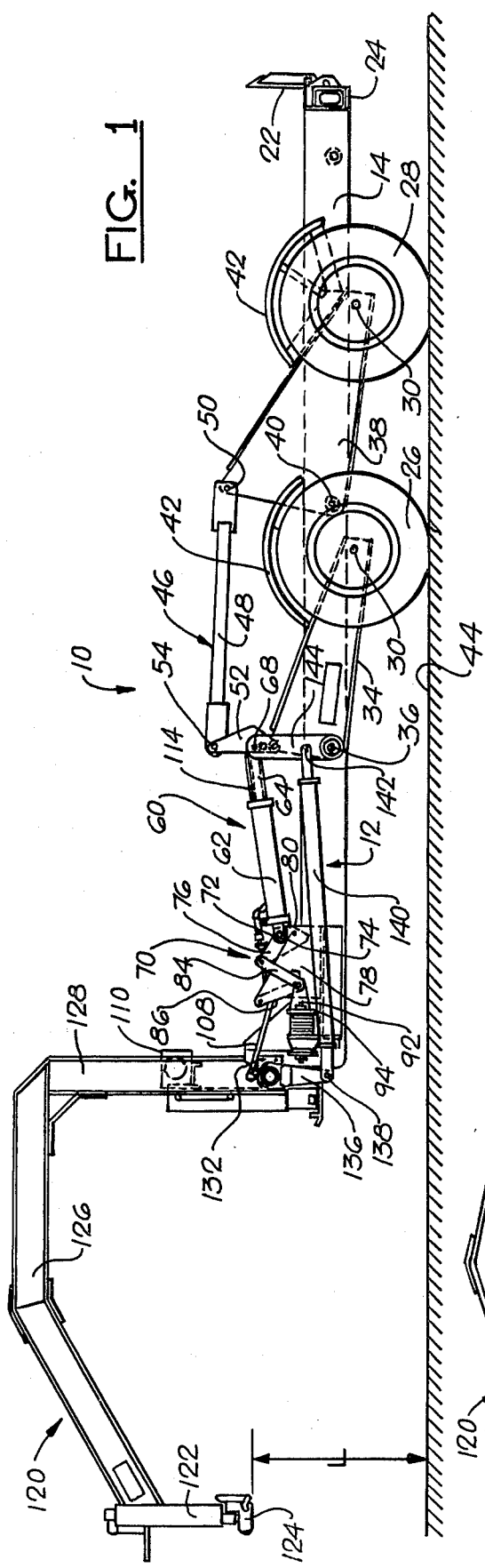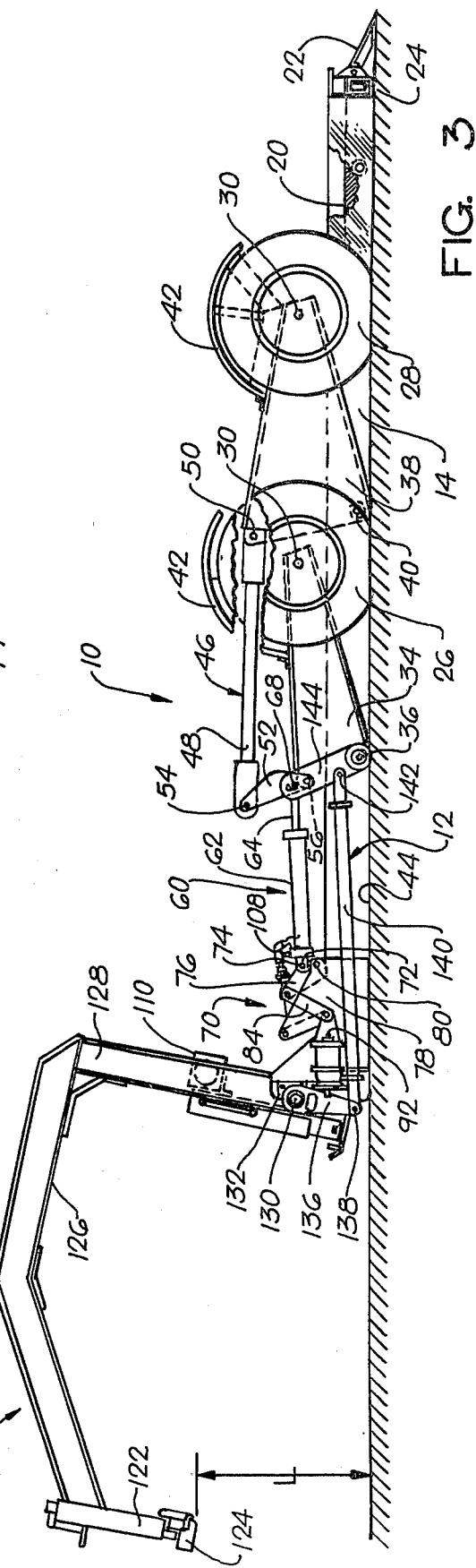

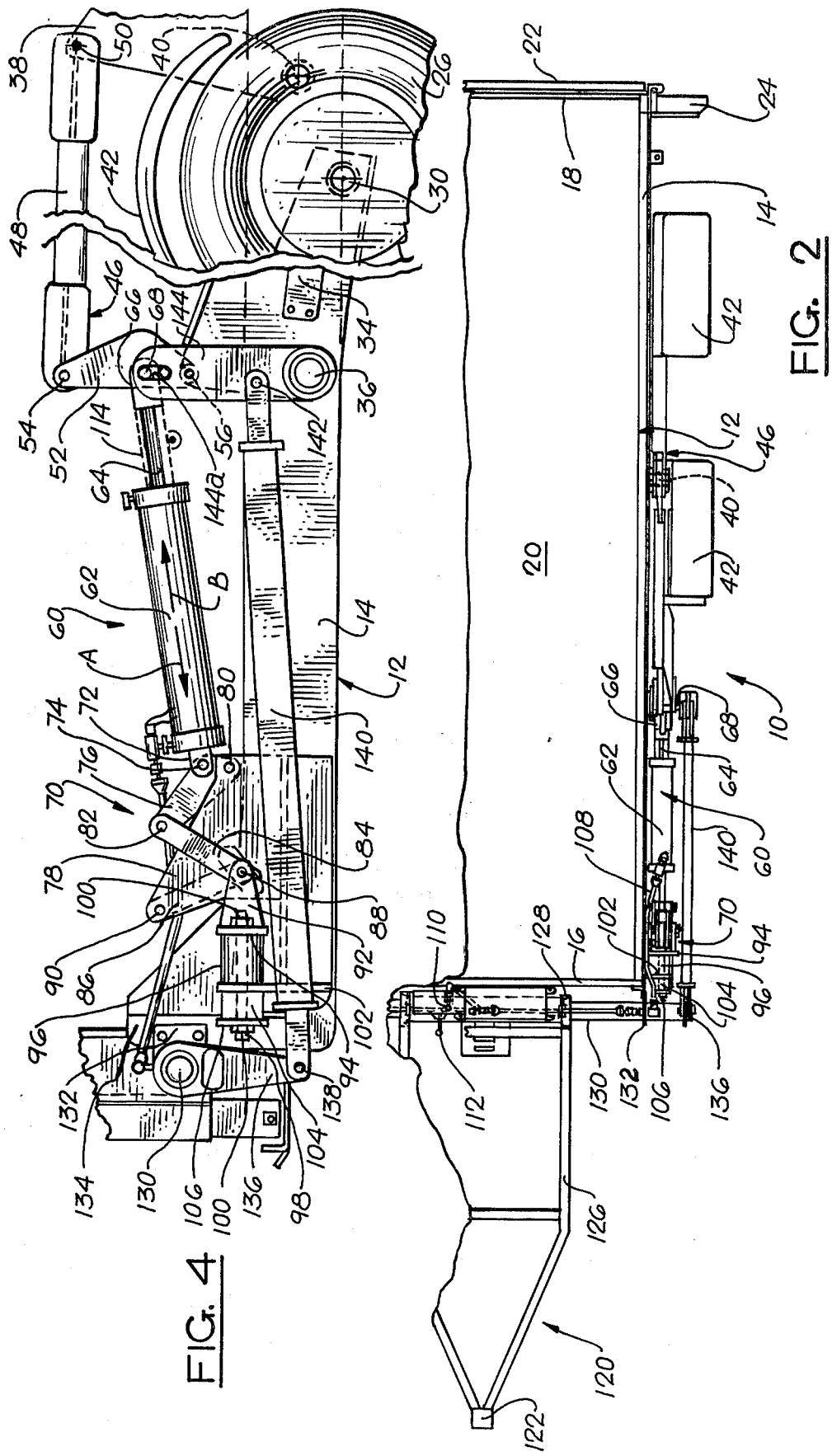

4,372,572

LIFT BED TANDEM AXLE TRAILER

BACKGROUND OF THE INVENTION

1. Field of the Invention

The present inventions relate to a lift bed, tandem axle trailer for over-the-road towing and more particularly is directed to a trailer wherein a load supporting base structure may be elevated from a lower or grounded position to any selected level above the ground for convenient loading/unloading and/or travel.

2. Description of the Prior Art

Trailers or agricultural implements having beds or frames that are adjustable vertically with respect to the ground are shown in the following U.S. Pat. Nos. 2,452,267; 2,560,625; 2,767,538; 2,774,606; 2,780,475; 2,806,710; 2,893,019; 2,937,775; 3,325,184; 3,658,362; 3,761,109; and 4,108,249. The following United States patents disclose tandem axle trailers having load equalizing devices interconnected between the wheels on each axle and some of the trailers disclosed have means for elevating and leveling the trailer bed relative to the ground or road surface: U.S. Pat. Nos. 2,612,387; 3,533,641; 4,058,325; and 4,061,353.

It is an object of the present invention to provide a new and improved lift bed, tandem axle trailer and more particularly a trailer of the character described having means for elevating the bed to selected levels above a lower level on the ground for loading/unloading and/or travel.

Another object of the present invention is to provide a new and improved lift bed tandem axle trailer of the character described having load equalizing means between the forward and aft wheels on each side of the trailer bed.

Another object of the invention is to provide a new and improved tandem axle trailer of the type described having a novel lift system for elevating the trailer bed between a lower position adjacent the ground and a selected level above the ground for loading/unloading or travel.

Yet another object of the present invention is to provide a new and improved lift bed, tandem axle trailer having a shock absorber system interconnected with the load equalizing mechanism between wheel support systems to provide a smoother ride during travel.

Still another object of the present invention is to provide a new and improved lift bed, tandem axle trailer which includes an interconnecting system between the trailer tongue and the lift mechanism.

Another object of the present invention is to provide a new and improved lift bed, tandem axle trailer which is economical in construction, easy to operate and which is suitable for carrying relatively heavy loads over long distance hauls.

SUMMARY OF THE INVENTION

The foregoing and other objects and advantages of the present invention are accomplished in a new and improved lift bed, tandem axle trailer which includes a bed with a load supporting base structure and a pair of wheel support arms mounted on each side of the bed for pivotal movement about respective fore and aft transverse axes. A stub axle and wheel is provided at the outer end of each support arm and the arms are pivotally supported to rotate about the respective supporting axes to raise and lower the level of the bed for loading, unloading and trailering. The trailer includes a tongue extending forwardly of the front of the bed having an outer end adapted to be hitched to a towing vehicle and load equalizing linkages are provided between fore and aft wheel support arms on each side of the bed. These linkages are interconnected with lift mechanisms for pivoting the wheel support arms to raise and lower the bed. A shock absorber system is interconnected with the lift mechanism on each side of the bed to provide a smoother ride for the load carried on the trailer.

BRIEF DESCRIPTION OF THE DRAWING

For better understanding of the invention, reference should be had to the following detailed description taken in conjunction with the drawings in which:

FIG. 1 is a side elevational view of a new and improved lift bed, tandem axle trailer constructed in accordance with the present invention and shown with the bed in an elevated position for travel, loading or unloading;

FIG. 2 is a top plan view of the trailer;

FIG. 3 is a side elevational view similar to FIG. 1 showing the trailer bed in a lowered position resting on the ground; and FIG. 4 is an enlarged, fragmentary side elevational view of a forward portion of the trailer.

DESCRIPTION OF A PREFERRED EMBODIMENT OF THE INVENTION

Referring now more particularly to the drawings, therein is illustrated a new and improved lift bed, tandem axle trailer constructed in accordance with the features of the present invention and referred to generally by the reference numeral 10. The trailer includes a generally rectangular shaped floor or bed structure 12 having a pair of longitudinally extending side members or rails 14 interconnected at the forward end by a transverse front end frame member 16 and at the rear by similar frame member 18. A plurality of intermediate transverse cross members are provided to support a floor 20 of the trailer bed and a loading ramp 22 is pivotally connected to the rear end cross member 18 for movement between a lowered, downwardly and rearwardly sloping loading position as shown in FIG. 3 and upstanding or vertical position wherein the ramp forms a tailgate for the end of the trailer floor structure. At the rear end of the trailer bed suitable tail and running lights 24 are provided which may include side clearance lights as well as conventional tail, brake and turn lights with a license plate holder on one side.

The trailer 10 includes pair of front and rear wheels 26 and 28 mounted in tandem fashion on each side outwardly of the frame of the bed 12. Each wheel is mounted on a stub axle or spindle 30 and the axles for the forward wheels 26 project laterally outwardly from the outer end of forward wheel support arms 34 which are mounted for pivotal movement on axles 36 which project outwardly from opposite sides of the side rails 14 of the trailer bed. Similarly, the rear wheel axles 30 are mounted to extend outwardly from outer ends of aft wheel support arms 38 which are supported and mounted for pivotal movement relative to the trailer bed 12 on axles 40 projecting oppositely outwardly from opposite side frame members 14 of the trailer bed.

The wheel support arms 34 and 38 are of generally triangular shape in side elevational view and if desired fenders 42 are attached to the upper edges of the support arms to shield against mud, water and ice coming from the rotating tires. As illustrated in FIGS. 1 and 3, the wheel support arms are pivotable about the respective laterally extending pivot axles 36 and 40 between a lowermost position as shown in FIG. 3 wherein the trailer bed 12 is resting on the surface of the ground, road or floor 44 and an upper or elevated position as shown in FIG. 1 wherein the trailer bed is elevated to a selected level space above the supporting surface 44.

In accordance with the present invention, on each side of the trailer bed 12 there is provided a load equalizing mechanism, generally designated by the reference numeral 46 for equalizing the load between each pair of tandem front and rear wheels 26 and 28 when uneven or unlevel road surfaces are encountered. The load equalizers include an elongated link 48 pivotally connected at its rearward end to a pin 50 mounted on an upper corner of the generally triangularly shaped aft support arm 38. At the front end, the link element 48 is pivotally interconnected to a triangularly shaped arm 52 having a pin 54 at the upper end thereof as illustrated. The lower end portion of the triangular shaped link member is pivotally interconnected to an upper corner of the front wheel support axle 34 by a pin 56. The load equalizing linkages 46 thus permit either the fore or aft wheels 26 or 28 to move up and down relative to the other when uneven or rough road conditions are encountered.

In order to pivot the wheel support arms 34 and 38 to raise or lower the bed 12 of the trailer, there is provided a lift mechanism, generally indicated by the reference numeral 60 on each side of the trailer bed structure forward of the forward wheel support arms 34. Each lift mechanism includes a hydraulic cylinder 62 having a piston rod 64 at the rearward end interconnected to the triangular shaped link 52 of the load equalizer by means of a clevis 66 and pin 68. The pin 68 is positioned to extend laterally of the triangular shaped link 52 intermediate the upper and lower ends thereof. The forward end of the hydraulic cylinder 62 is pivotally interconnected to a shock absorber mechanism, indicated generally by the reference numeral 70 and for this purpose the cylinder includes a clevis 72 and clevis pin 74 (FIG. 4) which is mounted to extend laterally of a triangular shaped linkage member 76 at a level intermediate the upper and lower ends thereof.

The linkage member 76 is pivotally mounted on an upstanding bracket 78 by means of a pivot pin 80 as best shown in FIG. 4. At the upper end, the triangular shaped link 76 is pivotally interconnected by a pin 82 to an intermediate link 84 having a lower end pivotally interconnected to a swing link 86 by a cross pin 88. The upper end of the swinging link 86 is pivotally secured by a pin 90 to an upper forward corner of the fixed bracket 78 which is secured to the trailer bed 12. The cross pin 88 is secured to the rear or aft end of a clevis linkage member 92 having a cross plate 94 joined thereto at the forward end. The cross plate 94 is secured against an annular donut-like shock member 96 formed of resilient material by means of an elongated thrust rod 98 threaded at opposite ends and having nut and washer assemblies 100 as shown.

The forward end of the resilient shock member 96 abuts against a laterally outwardly extending fixed bracket 102 secured to the side frame member 14 of the trailer bed. The rod 98 extends through an opening in the flange plate 102 and is coaxially aligned with a second, annular shaped shock element 104 also formed of resilient material such as rubber. At the forward end of the shock member 104, there is provide a bearing plate 106 secured in place by the nut and washer assembly 100 at the forward end of the rod 98.

Forward thrust from the forward end of cylinder 62 (as illustrated by the arrow A in FIG. 4), tends to pivot the triangular shaped link 76 in a counter-clockwise direction relative to the fixed pivot pin 80, and this in turn tends to move the intermediate link 84 in a forward direction. However, the lower end of the link 84 is interconnected by the pin 88 to the lower end of the swing link 86 and the rearward end of the clevis like element 92 secured to the cross plate 102. This arrangement transmits some of the forward thrust from the cylinder against the rearward face of the shock element 96 tending to compress the same and thus the shock element acts to dampen the load imposed thereon. Rearward or thrust movement of the cylinder 62 in an opposite direction as indicated by the arrow B (FIG. 4) exerts a compressive force on the forward shock member 104 through the forward end thrust plate 106 and rod 98. It will thus be seen that the shock absorber assembly 70 on each side of the trailer bed 12 provides a shock mounting for the forward ends of the hydraulic lift cylinders 62 for smoothing out the ride when uneven road surface 44 is encountered during travel. This in turn reduces high transient hydraulic pressures in the forward end of the cylinder which would otherwise be encountered when bumps or uneven road conditions were encountered during travel.

In order to control the level of the trailer bed 12 and maintain the level at a desired position above a support surface 44, hydraulic fluid is supplied to the forward end of the cylinders 62 through hydraulic lines 108 connected to the pressure side of a hydraulic power unit 110 mounted adjacent the forward end of the trailer as shown in FIGS. 1-3. A control valve 112 having a convenient operating handle is provided to direct hydraulic fluid into or out of the forward ends of the respective cylinders 62 to raise or lower the trailer bed as desired to any selected level. When additional fluid is introduced into the lift cylinders from the forward end thereof, the wheel support arms 34 and 38 on opposite sides of the trailer bed are pivoted in a direction whereby the outer ends of stub axles 30 move downward relative to the trailer bed 12 and this in turn causes the trailer bed to be elevated above the supporting surface 44 on which the wheels 26 and 28 are resting.

When it is desired to lower the level of the trailer bed 12, the control handle of the valve 112 is moved into a position permitting fluid in the forward ends of the cylinders to return to the reservoir of the hydraulic power unit. This occurs when the weight of the trailer bed and any loads thereon cause the bed to settle downwardly towards a lower position as shown in FIG. 3 wherein the bed is resting on the supporting surface 44. In the lowermost or ground position, vehicles or other wheeled objects may be easily rolled on to or off of the floor surface 20 as desired. After loading and unloading, the level of the trailer bed 12 may be elevated to a selected level for travel as shown in FIG. 1, for example, and when the desired position is obtained, a travel lock 114 (FIG. 1) may be placed in locking position on the exposed portion of the rod 64 between the rear end of the cylinder 62 and the forward end of the clevis 66. The lock when in position mechanically maintains the effective length of the hydraulic cylinder and lift mechanisms 60 for travel.

During unloading or loading of the trailer at a selected level, the cylinders 62 are maintained with fluid in the forward ends and the amount of fluid determines the precise level of the bed floor to match that of a dock or other surface onto which the loads are to be transferred or moved into place. When the trailer is ready to travel the level of the trailer bed and floor 20 is adjusted and the travel lock 114 is put in place on the rods 64 as shown in FIG. 4 and the pressurized fluid in the hydraulic cylinders may be bled off into the reservoir of the power supply unit 110 so that high transient hydraulic pressures will not be encountered during travel over rough road surfaces. With the travel locks 114 in place, shock loads in either direction acting from the forward end of the cylinders 62 are transmitted to the rubber cushion or shock absorber elements 104 and 96 as previously described and this provides a smoother ride for loads carried on the trailer floor 20.

In accordance with the present invention, the trailer 10 includes a forwardly extending tongue structure 120 having a socket 124 for attachment to a towing ball. The tongue structure is provided with a triangular shaped forward frame (as shown in plan view in FIG. 2) and at the apex of this section there is provided a manually adjustable socket jack 122 for adjusting the level of the socket 124 mounted at the lower end.

As illustrated in FIGS. 1 and 3, the tongue structure may include a goose neck like portion 126 for use in fifth wheel type towing arrangements and at the aft end of the tongue support structure there is provided a vertical section 128 having a pivot shaft 130 extending generally parallel of the structure adjacent the lower end. The pivot shaft 130 is supported for rocking movement in bearings 132 which are mounted on bracket plates 134 extending forwardly of the front frame cross member 116. At the outer ends of the pivot shaft, there is provided downwardly extending lever arms 136 pivotally connected at the lower end by pins 138 to the forward ends of rearwardly extending elongated link rods 140.

At the rearward end, each link rod is pivotally interconnected by a pivot pin 142 to an upstanding lever arm 144 journaled for free rocking movement about the forward wheel arm axles 36. As best shown in FIG. 4, adjacent to the upper end of the arms 144 there is formed an elongated slot 144a and the clevis pins 68 of the cylinder rod clevises 66 extend laterally outwardly and slidably engage the sides of the slots. When the triangular shaped links 52 of the equalizing mechanisms 60 pivot, the arms 144 and link rods 140 move correspondingly and the tongue assembly 120 is rocked about the shaft 130. As shown in FIG. 3, wherein the bed 12 of the trailer is resting on the ground 44 for loading and unloading, the tongue socket 124 is maintained at a level L above the ground. When the trailer bed 12 is elevated to match the elevation of a loading dock or the like or is moved into a selected level for travel, the linkages between the tongue 120 and the wheel support arms 34 maintains the socket 124 at essentially the same level L. This linkage arrangement also helps to maintain the bed relatively level as it is raised or lowered.

Although the present invention has been described with reference to a single illustrated embodiment thereof, it should be understood that numerous other modifications and embodiments can be devised by those skilled in the art that fall within the spirit and scope of the principles of this invention.

What is claimed as new and desired to be secured by Letters Patent of the United States is:

1. A lift bed, tandem axle, trailer, comprising:
   a bed having a load supporting floor structure with opposite sides and front and rear ends;
   a pair of wheel support arms mounted for pivotal movement about a pair of longitudinally spaced apart transverse axes on each side of said bed for raising and lowering the bed with respect to the ground;
   an axle and wheel mounted at the outer end of each support arm for rolling support of said bed;
   a tongue extending forwardly of the front end of said bed having an outer end adapted to be hitched to a pulling vehicle for towing said trailer;
   load equalizing linkage means between each pair of said wheel support arms on each side of said bed comprising a first link pivotally connected at one end to the rear support arm eccentric of the mounting axis thereof and a second link pivotally interconnected to an opposite end of said first link and pivotally connected to the front support arm eccentric of the mounting axis thereof;
   lift means on each side of said bed for pivoting said support arms to raise and lower said bed, said lift means including a longitudinally extensible thrust member having one end pivotally connected to said second link at a point between the pivotal connections of said first link and said front support arm therewith, said thrust member having an opposite end interconnected with said bed; and
   shock absorber means for interconnecting the opposite ends of said thrust member and said bed permitting limited travel of said ends in opposite directions longitudinally of said thrust member, said shock absorber means including a bracket fixed to said bed and a pair of resilient cushion members on opposite faces of said bracket, and pressure pad means connected with said thrust member for compressive engagement with said cushion members permitting limited travel of said opposite end of said thrust member in response to pivotal movement of a wheel support arm on said bed during travel.

2. The trailer of claim 1 wherein said pressure pad means include a pair of pressure pads disposed against respective oppositely facing outer surfaces of said resilient cushion members for alternately compressing the same toward said bracket in response to forces executed by said thrust member in opposite directions on said pressure pad means.

3. The trailer of claims 1 wherein said thrust member comprises a fluid cylinder having a piston and rod slideably disposed therein, said ends of said thrust member formed by opposite end portions of said cylinder and said rod.

4. The trailer of claim 3 including removable travel lock means for mechanically fixing the relative position of said rod and said cylinder during travel of said trailer.

5. The trailer of claim 2 wherein said resilient cushion members are formed with a central bore aligned on a common thrust axis extending through openings framed in said bracket and said pressure pads, and including a rod extending through said bore of said cushion members, and said openings in bracket and pressure pads and means acting on said rod element for biasing said pressure pads toward said bracket.

6. The trailer of claim 5 including a connector assembly for interconnecting a rearward end portion of said rod element and said thrust member.

7. A lift bed, tandem axle, trailer, comprising:

a bed having a load supporting floor structure with opposite sides and front and rear ends;

a pair of wheel support arms mounted for pivotal movement about a pair of longitudinally spaced apart transverse axes on each side of said bed for raising and lowering the bed with respect to the ground;

an axle and wheel mounted at the outer end of each support arm for rolling support of said bed;

a tongue extending forwardly of the front end of said bed having an outer end adapted to be hitched to a pulling vehicle for towing said trailer;

means for supporting said tongue for pivotal movement about a transverse pivot axis adjacent said front end of said bed, and tongue linkage means for interconnecting said wheel support arms and said tongue for maintaining said outer end of said tongue at a relatively constant level when said bed is raised or lowered;

said tongue support means including a shaft aligned on said pivot axis and interconnected with an inner end portion of said tongue intermediate the ends of said shaft and said tongue linkage means includes a pair of tongue linkages on opposite sides of said bed interconnected between outer ends of said shaft and said lift means;

load equalizing linkage means between each pair of said wheel support arms on each side of said bed comprising a first link pivotally connected at one end to the rear support arm eccentric of the mounting axis thereof and a second link pivotally interconnected to an opposite end of said first link and pivotally connected to the front support arm eccentric of the mounting axis thereof; and lift means on each side of said bed for pivoting said support arms to raise and lower said bed, said lift means including a longitudinally extensible thrust member having one end pivotally connected to said second link at a point between the pivotal connections of said first link and said front support arm therewith, said thrust member having an opposite end interconnected with said bed.

8. The trailer of claim 7 wherein each of said tongue linkages includes a first leg on said shaft pivotally connected at an outer end portion with of forward end of a link member, said link member having a rearward end pivotally connected to a second leg mounted for pivotal movement about the transverse pivot axis of said front wheel support arms, said second leg being pivotally interconnected with said second link of said load equalizing linkage means.

9. The trailer of claim 8 wherein said second leg and said second link of said load equalizing linkage means are interconnected with a pin and slot connector.

10. The trailer of claim 9 wherein said pin and slot connection includes a pin mounted on said second link engaged to slide in an elongated slot formed in said second leg.

11. The trailer of claim 7 wherein said tongue linkage means maintains said bed in general parallelism with respect to said ground when said bed is raised or lowered.

* * * * *